H. BEBIÉ & H. KOCH.
MILLING CUTTER FOR WOODWORK.
APPLICATION FILED FEB. 26, 1914.
1,100,667.
Patented June 16, 1914.
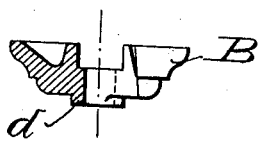
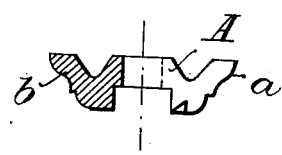
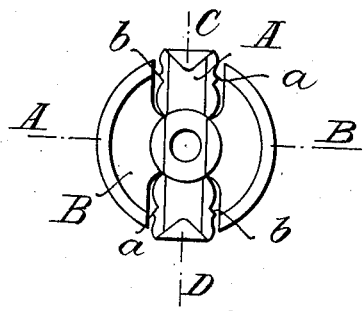
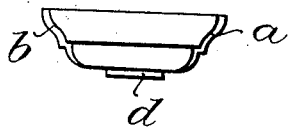
Witnesses
Inventors

UNITED STATES PATENT OFFICE.

HEINRICH BEBIÉ, OF ALTONA-BAHRENFELD, AND HENRY KOCH, OF ALTONA-OTTENSEN, GERMANY.

MILLING-CUTTER FOR WOODWORK.

1,100,667. Specification of Letters Patent. Patented June 16, 1914.

Application filed February 26, 1914. Serial No. 821,203.

*To all whom it may concern:*

Be it known that we, HEINRICH BEBIÉ, a citizen of the Swiss Republic, and resident of No. 8 Mozartstrasse, Altona-Bahrenfeld, in the Empire of Germany, and HENRY KOCH, a subject of the King of Prussia, and resident of No. 201 Bahrenfelderstrasse, Altona-Ottensen, in the Empire of Germany, have invented a new Improved Milling-Cutter for Woodwork, of which the following is a specification.

Milling-cutters for wood work are constructed either in the shape of cutter heads with interchangeable knives or in the shape of solid steel bodies which are directly provided with the cutting edges required.

In order to render milling machines suitable for the production of molded beads without the danger of splintering the wood and without the risk of mutilating the fingers, the cutter head has been shaped to conform to the shape or profile of the knives, the knives projecting some distance in accordance with the thickness of the chips.

According to the present invention directly sharpened milling-cutters for wood work are provided with guide bodies in such a manner, that the cutting edges can be sharpened like a plane-iron, whereas hithertofore such milling-cutters had to be provided with obtuse angled cutting edges.

As an example of carrying into practice this invention in the accompanying drawing is shown in Figure 1 an improved milling-cutter for woodwork in back elevation. Fig. 2 is partly an elevation and partly a vertical section on line A—B of Fig. 1 of the molded guide body to be attached to the milling-cutter. Fig. 3 is partly an elevation and partly a vertical section on line C—D of Fig. 1 of the milling-cutter. Fig. 4 is a side elevation of the milling-cutter combined with the guide body.

The milling-cutter A is provided with two sets of suitably molded cutting edges, the set marked $a$, $a$ being destined for use in one direction, the set marked $b$, $b$ being destined for use in the other direction of rotation.

According to the present invention a guide body B showing the same profile as the cutting edges of the milling-cutter A is concentrically secured in a suitable recess of the latter, receding the thickness of the chips pared off in each cutting action. By means of this guide body B the milling-cutter A is closed up in a circle all around, except a slot left open in front of each cutting edge. This allows the cutting edges to be sharpened like a plane-iron. The boss $d$ of the guide body B is cut flat at both sides by two parallel cuts, so that it can be rigidly secured in a correspondingly shaped recess of the milling-cutter A.

We do not desire to be understood as limiting ourselves to the detail construction and arrangement of parts as herein shown and described, as it is manifest that variations and modifications therein may be resorted to, in the adaptation of our invention to varying conditions of use, without departing from the spirit and scope of our invention and improvements. We therefore reserve the right to all such variation and modification as properly falls within the scope of our invention and the terms of the following claim.

What we do claim as our invention, and desire to secure by Letters Patent, is:

Milling-cutter for wood work, comprising the cutter proper A provided with suitably shaped cutting edges sharpened like a plane-iron, and a guide body B corresponding in profile to the cutting edges rigidly secured to the milling-cutter and closing up the latter in a circle except a slot left open in front of each cutting edge, the molded surface of the circular guide body receding from the cutting edges the thickness of the chips pared off in each cutting action, substantially as described and shown and for the purposes set forth.

In witness whereof we have hereunto signed our names this 9th day of February 1914, in the presence of two subscribing witnesses.

HEINRICH BEBIÉ.
HENRY KOCH.

Witnesses:
ERNEST H. L. MUMMENHOFF,
IDA CHRIST. HAFERMANN.

Copies of this patent may be obtained for five cents each, by addressing the "Commissioner of Patents, Washington, D. C."